Dec. 8, 1931. W. C. MARTIN 1,835,415
PNEUMATIC TUBE AND METHOD OF MANUFACTURE
Filed May 31, 1929
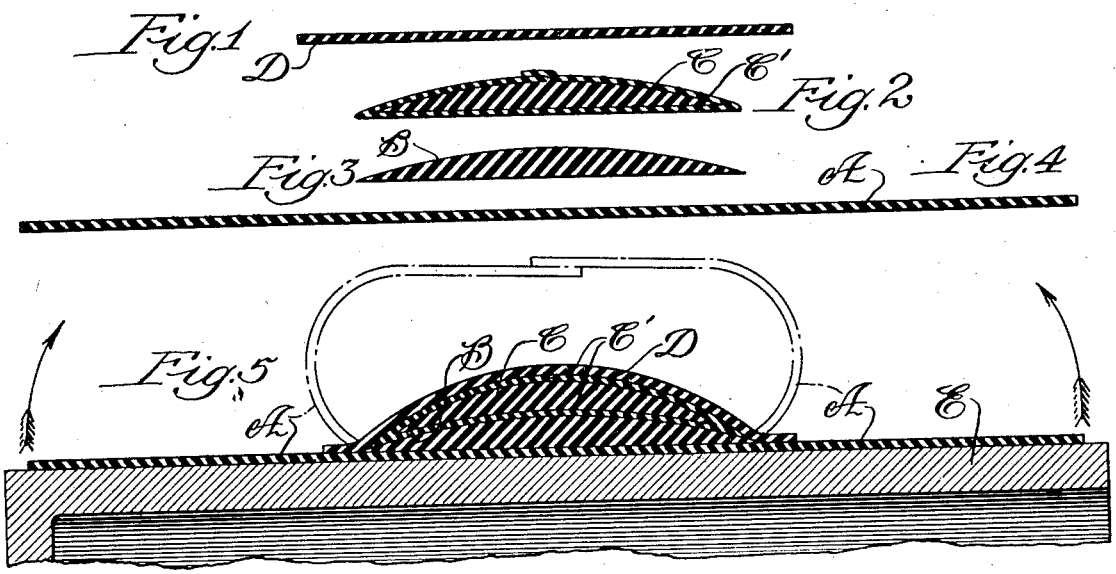
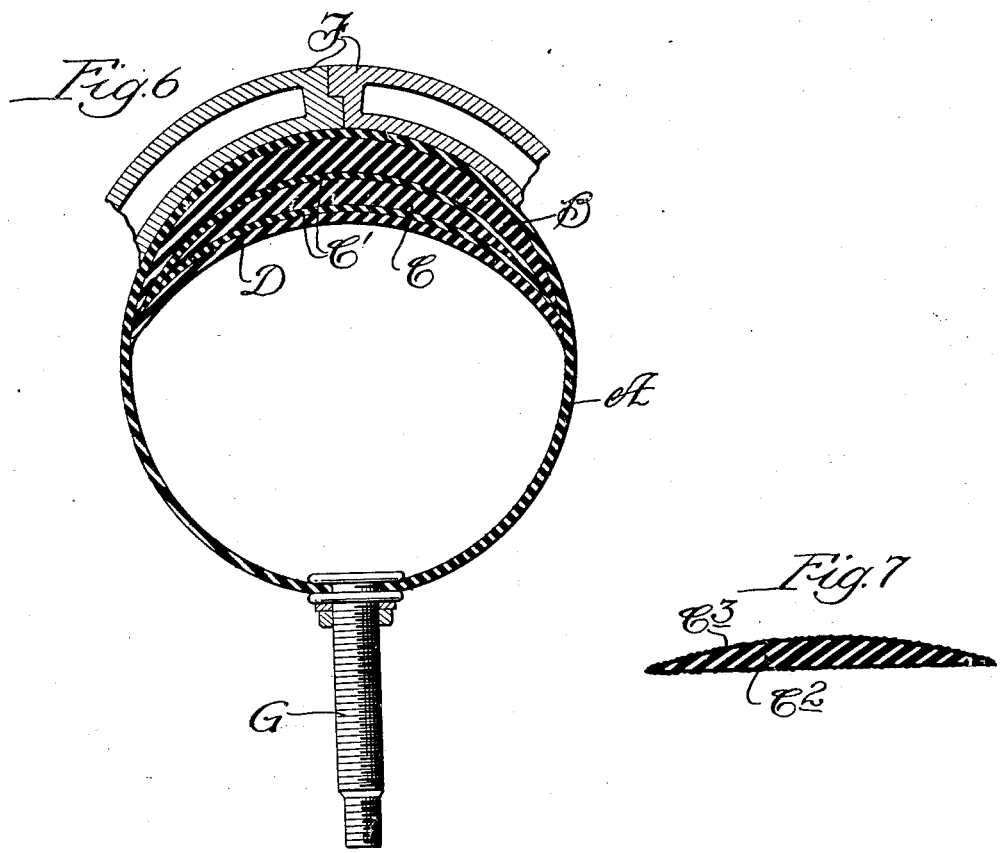
Inventor:
William C. Martin Patented Dec. 8, 1931

1,835,415

UNITED STATES PATENT OFFICE

WILLIAM C. MARTIN, OF CHICAGO, ILLINOIS, ASSIGNOR TO JOHN H. LEE, OF OAK PARK, ILLINOIS

PNEUMATIC TUBE AND METHOD OF MANUFACTURE

Application filed May 31, 1929. Serial No. 367,457.

This invention relates particularly to the manufacture of an improved puncture-proof tube for pneumatic tires, and the primary object is to provide for the production of an improved tube of this character by an improved method which will insure the preservation of the self-healing quality of the tube and at the same time enable such tubes to be manufactured rapidly and economically.

The invention is illustrated in a preferred embodiment in the accompanying drawings, in which:—

Figs. 1-4 show the several component parts entering into the structure of the tube; Fig. 5, a broken sectional view illustrating the manner in which the parts of the tube are built up on a mandrel or drum; Fig. 6, a broken sectional view illustrating the manner in which the tube is molded and vulcanized; and Fig. 7, a view showing a modification of the element shown in Fig. 2.

The invention contemplates, in the preferred practice of the process, the production of the tube as a whole by a single vulcanizing operation, suitable precautions being taken to preserve the self-healing compound which is employed from being vulcanized, or hardened, by preventing the migration of sulphur into said compound during the vulcanizing operation.

Referring to Figs. 1-6, A designates a strip of rubber which is formed into a tube; B a strip of rubber which serves as a tread-thickening pad; C a strip of self-healing compound having an enveloping and protecting jacket C'; and D a relatively narrow strip of rubber between which and the tube-forming strip A the bodies B and C are confined.

The strips A, B and D are of uncured rubber, suitably compounded with sufficient sulphur to enable them to be properly cured in accordance with the usual practice of curing inner tubes, but avoiding the presence of free sulphur after the operation. The strip B has a thickened center portion and tapering edge portions.

The strip C is composed of a self-healing compound which is not supplied with sulphur, and which is, in the process of manufacture, protected against sulphur reaching the same by migration. The self-healing body C may be composed of any suitable compound which will serve the purpose. The following is a suitable compound:—

|  | Pounds | Ounces |
|---|---|---|
| Rubber (reclaimed) | 52 | 12 |
| Rubber (rolled brown crepe) | 52 | 10 |
| Synthetic (so-called liquid) rubber | 3 | 4 |
| Granulated asphaltum or mineral rubber (M. R. X.) | 10 | 12 |
| Neutral lubricating oil | 5 | 10 |

The so-called synthetic rubber, sometimes called liquid rubber, may consist of rosin and burgundy pitch, for example, in suitable proportions. A suitable neutral lubricating oil is known on the market as "Junior Red Engine Oil". The so-called mineral rubber may be a pine tar composition, an asphaltum composition, or a mixture.

The ingredients of the self-healing compound may be mixed on the rolls or in any suitable manner. The material may then be rolled into sheets; these sheets may be cut into strips of varying widths; and the strips which are of somewhat soft, tacky character, may be pressed and formed to provide a thickened center portion and tapering edge portion. Another and more rapid method is to extrude the composition through a suitable die.

The strip B may also be extruded through a suitable die.

The envelope C' which protects the self-healing compound from vulcanization, may consist of a cured rubber strip, or a semi-cured rubber strip. The strip may be folded about the compound in the manner illustrated in Fig. 2. If desired, paper impregnated or covered with rubber cement having therein a chemical having an affinity for sulphur, may be employed in lieu of the rubber strip C'.

In the modification shown in Fig. 7, the self-healing compound is designated C². It is coated with a rubber compound containing a chemical having an affinity for sulphur, such as litharge. For example, the coating may be composed as follows:—

| | Lbs. |
|---|---|
| Rubber | 100 |
| Litharge | 20 |
| Zinc oxide | 5 |
| Sulphur | 3 |

The sulphur is used in such limited amount as to effect a suitable cure of the compound. It will not pass, however, into the self-healing compound owing to the greater affinity of the litharge or lead oxide, for sulphur. Under suitable conditions, it is possible that the sulphur may be omitted from the coating, designated C³, shown in Fig. 7.

In forming the tube in accordance with the preferred method, the strip A is first wrapped about the drum E and the ends brought into overlapping relation; the strip B is then wrapped about the drum and its ends brought into overlapping relation; the strip C within the envelope C' is then wrapped about the drum and its ends brought into overlapping relation; the strip D is then wrapped about the drum and its ends brought into overlapping relation. The joints at the ends of the strips may be broken if desired. The strips B and C may have their ends tapered at the overlaps. Finally, the lateral edge portions of the strip A are curved upwardly and brought into overlapped relation in the manner illustrated by the dotted lines in Fig. 5.

The tube is then placed in a vulcanizing full-circular mold G; heavy air pressure is introduced; and steam is admitted to the mold to effect the curing operation. The curing may be completed within a few minutes.

It will be noted that the manner in which the tube is formed in Fig. 5 results in reversing the order of the pad B, the self-healing body C, and the covering strip D. Thus, the pad B is, after the curing operation, outside of the self-healing body. In the curing operation, the tube A, pad B, and strip D unite and become a practically integral formation; and the self-healing body C is contained within the thickened tread-portion of the tube. The pad B coalesces with the tread-portion of the tube A, and thus a thick cured tread-portion of rubber is formed outside the self-healing body. In case of a puncture, followed by withdrawal of the puncturing nail, for example, the self-healing compound adheres to the surface of the nail and is drawn therewith into the puncture opening, effectively plugging the opening.

Repeated demonstrations under practical working conditions have proven that a tube of this character may be punctured hundreds of times without appreciable loss of pressure.

It is highly important that the tread-portion of the tube should be composed of thickened, vulcanized rubber; and it is also highly important that the self-healing compound be sufficiently mobile and tacky to flow into and close the puncture, without being in liquid condition. Also, it is important that the compound shall be of non-freezing character, and that it shall be so protected that vulcanization cannot occur under the effect of heat developed by the use of the tire in hot weather. By preventing sulphur from reaching the self-healing compound, injurious change of the composition is prevented, even though the tire be subjected to working conditions producing a high temperature.

In my application, Serial No. 311,303, filed October 9, 1928, I disclosed a method of producing a puncture proof tube. In that case, migration of sulphur into the self-healing compound was prevented by employing a pre-vulcanized inner tube and a pre-vulcanized pad, the self-healing compound being introduced between the pad and inner tube in the process of manufacture. The product produced by the process referred to is highly effective as a puncture proof tube, but is expensive to manufacture. The present process greatly reduces the cost of manufacture and enables a large output to be obtained in a factory of moderate size and limited equipment.

It may be added that in building up the tube in the manner illustrated in Fig. 5, the uncured rubber sheets will readily adhere together when treated slightly with gasoline at the surfaces which are to be stuck together. The sheets may be stuck together by slight compression, such as can be produced by a small tool or wheel by the well known "stitching" operation.

If desired, the protecting compound C³ may be applied to adjacent surfaces of the strips B and D (Figs. 1 and 3), thus serving as a substitute for the jacket C', which may in that case be omitted. Also, if desired, the strips A and B, instead of being produced separately in the first instance, may be produced as one piece. Other modifications are contemplated.

It may be added that where the pad B is separately formed, it may be of a cheaper rubber compound than is desirable in the tube-stock of the sheet A. In practice, the envelope C' which may be very thin coalesces with the pad B and the strip D in the vulcanizing operation.

It will be noted from Fig. 6 that the tube-forming sheet A is provided, prior to the vulcanizing operation, with a valve-stem G which enables the tube to be inflated after the mold has been closed.

The green rubber tube having a thick tread-portion provided with a circumferential cavity containing a sealing compound effectively protected against sulphur migration may be built up in any suitable manner; and such a structure may be vulcanized as a unit without destroying the self-healing quality of the self-healing plastic described. That is, while the plastic described is capable of vulcanization, it is effectively protected against vulcanization. It may be remarked that raw rubber (pure, uncompounded gum) is vulcanizable and will not, alone, serve to prevent vulcanization; hence, it is not suitable for a protecting envelope, even though it contains no sulphur, owing to the fact that migration of sulphur will occur from the adjoining compound containing sulphur.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is:

1. The method of producing a puncture-proof inner tube, which comprises: forming a tube of vulcanizable rubber compound, said tube having a thickened tread-portion containing therein a body of self-healing compound protected against sulphur migration; and vulcanizing said tube.

2. The method of producing a puncture-proof inner tube, which comprises: forming a tube of vulcanizable rubber compound, said tube having a thickened tread-portion containing therein a body of self-healing compound protected against sulphur migration; and introducing said tube into a mold and inflating and vulcanizing the tube.

3. The method described in claim 1, characterized by the use of a protecting envelop about the body of self-healing compound effective to prevent vulcanization of the self-healing compound.

4. The method described in claim 1, characterized by the use of a cured or semi-cured rubber envelop enclosing the body of self-healing compound.

5. The method specified in claim 1, characterized by the use of a protecting envelop about the body of self-healing compound, containing a chemical agent having a high affinity for sulphur.

6. The method of producing a puncture-proof inner tube, which comprises: building upon a mandrel a carcass comprising a tube-forming strip, a tread-thickening strip, a sheathed strip of self-healing compound, and a relatively narrow housing strip; bringing together the lateral edges of the tube-forming strip; and inflating and vulcanizing the tube within a mold.

7. The method of producing a puncture-proof inner tube, which comprises: building upon a cylindrical mandrel a carcass comprising an uncured cylindrical sheet of tube stock, an encircling uncured tread-thickening pad, and an encircling jacketed body of self-healing compound; bringing the lateral edge-portions of the cylindrical sheet together so as to enclose the other elements; and inflating the tube and subjecting it to curing action within a mold.

WILLIAM C. MARTIN.